United States Patent
Choi et al.

(10) Patent No.: US 9,648,224 B2
(45) Date of Patent: May 9, 2017

(54) APPARATUS AND METHOD OF PROCESSING IMAGE

(71) Applicant: Hanwha Techwin Co., Ltd., Changwon-si (KR)

(72) Inventors: Moon Gyu Choi, Changwon-si (KR); Ji Hong Kim, Changwon-si (KR); Seok Jun Yoon, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/908,315

(22) PCT Filed: Apr. 16, 2014

(86) PCT No.: PCT/KR2014/003287
§ 371 (c)(1),
(2) Date: Jan. 28, 2016

(87) PCT Pub. No.: WO2015/026041
PCT Pub. Date: Feb. 26, 2015

(65) Prior Publication Data
US 2016/0198082 A1 Jul. 7, 2016

(30) Foreign Application Priority Data
Aug. 20, 2013 (KR) .................. 10-2013-0098606

(51) Int. Cl.
*H04N 5/272* (2006.01)
*G06T 5/50* (2006.01)
(Continued)

(52) U.S. Cl.
CPC ... *H04N 5/23212* (2013.01); *G06F 17/30259* (2013.01); *G06F 17/30265* (2013.01);
(Continued)

(58) Field of Classification Search
CPC .... H04N 5/23212; H04N 5/272; H04N 5/265; H04N 5/2356; H04N 5/2621;
(Continued)

(56) References Cited

U.S. PATENT DOCUMENTS 8,477,232 B2 * 7/2013 Forutanpour ......... G06T 7/0067
348/239
2007/0285528 A1 * 12/2007 Mise .................. H04N 5/23212
348/222.1

(Continued)

FOREIGN PATENT DOCUMENTS

JP 2003-195148 A 7/2003
JP 2011-53299 A 3/2011
(Continued)

OTHER PUBLICATIONS

International Search Report (PCT/ISA/210) issued Jul. 10, 2014, issued in International Application No. PCT/KR2014/003287.
(Continued)

*Primary Examiner* — Roberto Velez
*Assistant Examiner* — Tuan Le
(74) *Attorney, Agent, or Firm* — Sughrue Mion, PLLC

(57) ABSTRACT

Image processing apparatus and method of calculating distance information and size information of an object within an image frame are provided. The method of processing an image includes: sequentially moving a focus lens from infinity to a short distance; overlapping and storing frames including an object focused at each movement location of the focus lens; and displaying a synthesis frame that synthesizes the overlapped frames in one frame, and simultaneously, calculating relative distance information of objects focused at different locations of the focus lens based on an
(Continued)

object focused at an arbitrary location of the focus lens, and displaying the relative distance information in the synthesis frame.

16 Claims, 14 Drawing Sheets

(51) Int. Cl.
| | |
|---|---|
| H04N 5/232 | (2006.01) |
| H04N 5/235 | (2006.01) |
| H04N 5/262 | (2006.01) |
| G06F 17/30 | (2006.01) |
| G06K 9/52 | (2006.01) |
| G06T 7/20 | (2017.01) |
| G06T 7/60 | (2017.01) |
| H04N 5/265 | (2006.01) |
| G06T 5/00 | (2006.01) |
| G06T 7/571 | (2017.01) |

(52) U.S. Cl.
CPC ............... *G06K 9/52* (2013.01); *G06T 5/003* (2013.01); *G06T 5/50* (2013.01); *G06T 7/20* (2013.01); *G06T 7/571* (2017.01); *G06T 7/60* (2013.01); *H04N 5/2356* (2013.01); *H04N 5/23293* (2013.01); *H04N 5/265* (2013.01); *H04N 5/2621* (2013.01); *H04N 5/272* (2013.01)

(58) Field of Classification Search
CPC ... H04N 5/23293; G06T 5/003; G06T 7/0069; G06T 5/50; G06T 7/20; G06T 7/60; G06F 17/30259; G06F 17/30265; G06K 9/52
See application file for complete search history.

(56) References Cited

U.S. PATENT DOCUMENTS

| | | | |
|---|---|---|---|
| 2008/0189036 A1* | 8/2008 | Elgersma | G06T 7/0069 382/153 |
| 2008/0297639 A1* | 12/2008 | Honjo | G03B 13/30 348/333.05 |
| 2009/0109304 A1* | 4/2009 | Guan | H04N 5/23212 348/240.99 |
| 2010/0033617 A1* | 2/2010 | Forutanpour | G06T 7/0067 348/345 |
| 2010/0165152 A1* | 7/2010 | Lim | G06T 5/50 348/240.99 |
| 2010/0171815 A1 | 7/2010 | Park et al. | |
| 2011/0157400 A1* | 6/2011 | Kim | H04N 5/23216 348/222.1 |
| 2012/0148109 A1* | 6/2012 | Kawamura | G01C 3/06 382/106 |
| 2013/0033578 A1* | 2/2013 | Wajs | G06T 7/0065 348/46 |

FOREIGN PATENT DOCUMENTS

| | | |
|---|---|---|
| JP | 2012-156747 A | 8/2012 |
| KR | 10-2009-0056592 A | 6/2009 |
| KR | 10-2010-0080704 A | 7/2010 |
| KR | 10-2011-0104748 | 9/2011 |
| KR | 10-2013-0017918 A | 2/2013 |

OTHER PUBLICATIONS

Written Opinion (PCT/ISA/237) issued Jul. 10, 2014, issued in International Application No. PCT/KR2014/003287.

* cited by examiner

| APERTURE VALUE | SHUTTER SPEED |
|---|---|
| f/2.8 | 1/120 |
| f/4 | 1/60 |
| f/5.6 | 1/30 |
| ⋮ | ⋮ |

APPARATUS AND METHOD OF PROCESSING IMAGE

This application is a National Stage Entry of International Application No. PCT/KR2014/003287 filed Apr. 16, 2014, in the Korean Intellectual Property Office, which claims priority from Korean Patent Application No. 10-2013-0098606 filed Aug. 20, 2013, the contents of all of which are incorporated herein by reference in their entirety.

TECHNICAL FIELD

The inventive concept relates to an apparatus and a method of calculating distance information and size information of an object within an image frame.

BACKGROUND ART

Various apparatuses for measuring a distance between objects are provided. An ultrasonic short distance measurement apparatus for measuring a short distance of several meters, and an infrared long distance measurement apparatus for measuring a long distance of several hundred meters or several kilometers, etc. are provided. The distance measurement apparatuses are manufactured as separate apparatuses. In the case where the distance measurement apparatuses are attached to a specific apparatus and manufactured, since the volume of the whole apparatus increases, the apparatus is limited in space when the apparatus is designed, and the volume increase is contradictory to a miniaturization trend of the apparatus.

DETAILED DESCRIPTION OF THE INVENTION

Technical Problem

The inventive concept provides image processing apparatus and method of calculating and displaying distance information of an object inside an image frame without a separate distance measurement algorithm.

The inventive concept provides image processing apparatus and method of calculating distance information of an object inside an image frame, and calculating and displaying size information of the object according to the calculated distance information without a separate size measurement algorithm.

Technical Solution

According to an aspect of the inventive concept, there is provided a method of processing an image, the method including: sequentially moving a focus lens from infinity to a short distance; overlapping and storing frames including an object focused at each movement location of the focus lens; and displaying a synthesis frame that synthesizes the overlapped frames in one frame, and simultaneously, calculating relative distance information of objects focused at different locations of the focus lens based on an object focused at an arbitrary location of the focus lens, and displaying the relative distance information in the synthesis frame.

The overlapping and displaying may include: when at least two objects exist at an arbitrary location of movement locations of the focus lens, overlapping and storing frames including a selected object.

The method may further include: establishing a database that maps actual distance information from an image processing apparatus to an object to each movement location of the focus lens.

The displaying may include: displaying a synthesis frame that synthesizes the overlapped frames in one frame, and simultaneously, and retrieving the actual distance information mapped to the location of the focus lens when each object is focused from the database, and displaying the actual distance information on the synthesis frame.

The method may further include: calculating a size of each object inside the synthesis frame, calculating an actual distance information ratio of focused other objects based on actual distance information mapped to a focused arbitrary object, and calculating and displaying actual size information of the objects by applying the ratio to a size of each object.

According to an aspect of the inventive concept, there is provided a method of processing an image, the method including: operating an opening degree of an aperture from a maximum opening to a minimum opening; overlapping and storing frames including an object focused under each open state of the aperture; and displaying a synthesis frame that synthesizes the overlapped frames in one frame, and simultaneously, calculating relative distance information of objects focused under other open states of the aperture based on an object focused under an arbitrary open state of the aperture, and displaying the relative distance information in the synthesis frame.

The overlapping and storing may include: when at least two objects exist under an arbitrary open state of open states of the aperture, overlapping and storing frames including a selected object.

The method may further include: establishing a database that maps actual distance information from an image processing apparatus to an object to each open state of the aperture.

The method may further include: mapping and storing a different shutter speed depending on each open state of the aperture when establishing the database.

The displaying may include: displaying a synthesis frame that synthesizes the overlapped frames in one frame, and simultaneously, and retrieving the actual distance information mapped to an open state of the aperture from the database when each object is focused, and displaying the retrieved actual distance information inside the synthesis frame.

The method may further include: calculating a size of each object inside the synthesis frame, calculating an actual distance information ratio of focused other objects based on actual distance information mapped to a focused arbitrary object, and calculating and displaying actual size information of the objects by applying the ratio to a size of each object.

According to an aspect of the inventive concept, there is provided an image processing apparatus including: a focus lens; a lens driver sequentially moving a focus lens from infinity to a short distance; and a distance information calculator overlapping and storing frames including an object focused at each movement location of the focus lens, and display a synthesis frame that synthesizes the overlapped frames in one frame, and simultaneously, calculating and displaying relative distance information of objects focused at different locations of the focus lens based on an object focused at an arbitrary location of the focus lens.

The distance information calculator may overlap and store frames including a selected object when at least two objects exist at an arbitrary location of movement locations of the focus lens.

The distance information calculator may establish a database that maps actual distance information from an image processing apparatus to an object to each movement location of the focus lens, and retrieve the actual distance information mapped to the location of the focus lens when each object is focused from the database, and display the actual distance information inside the synthesis frame.

The apparatus may further include: a size information calculator configured to calculate a size of each object inside the synthesis frame, calculate an actual distance information ratio of focused other objects based on actual distance information mapped to a focused arbitrary object, and calculate and display actual size information of the objects by applying the ratio to a size of each object.

According to an aspect of the inventive concept, there is provided an image processing apparatus including: an aperture; an aperture driver operating an opening degree of an aperture from a maximum opening to a minimum opening; and a distance information calculator overlapping and storing frames including an object focused under each open state of the aperture, display a synthesis frame that synthesizes the overlapped frames in one frame, and simultaneously, calculating and displaying relative distance information of objects focused under other open states of the aperture based on an object focused under an arbitrary open state of the aperture.

The distance information calculator may overlap and store frames including a selected object when at least two objects exist under an arbitrary open state of open states of the aperture.

The distance information calculator may establish a database that maps actual distance information from the image processing apparatus to an object to each open state of the aperture, and retrieve the actual distance information mapped to an open state of the aperture when each object is focused from the database, and display the retrieved actual distance information inside the synthesis frame.

The distance information calculator may map and store a different shutter speed depending on each open state of the aperture when establishing the database.

The apparatus may further include: a size information calculator configured to calculate a size of each object inside the synthesis frame, calculate an actual distance information ratio of focused other objects based on actual distance information mapped to a focused arbitrary object, and calculate and display actual size information of the objects by applying the ratio to a size of each object.

Advantageous Effects

According to exemplary embodiments, distance information and size information of an object inside an image frame may be calculated without a separate distance measurement algorithm or size measurement algorithm.

BEST MODE

Figure 1:
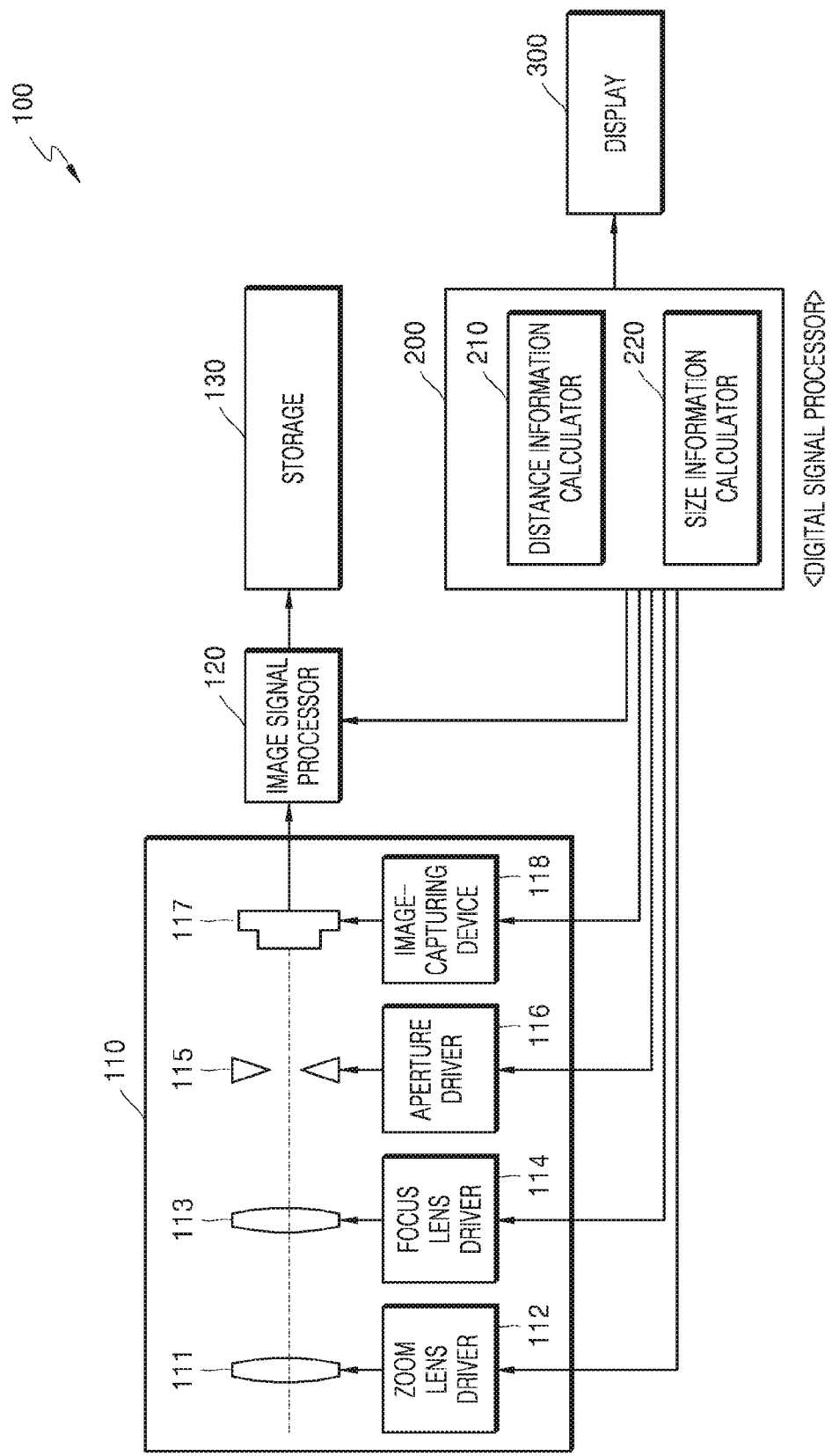
FIG. 1 is a block diagram illustrating an image processing apparatus according to an exemplary embodiment.

Exemplary embodiments are described below with reference to the accompanying drawings. Like reference numerals in the drawings denote like or corresponding elements, and repeated descriptions thereof are omitted.

FIG. 1 is a block diagram illustrating an image processing apparatus 100 according to an exemplary embodiment. Referring to FIG. 1, the image processing apparatus 100 includes an image-capturing unit 110, an image signal processor 120, a storage 130, a digital signal processor 200, and a display 300. Light from an object passes through a zoom lens 111 and a focus lens 113, which are an optical system of the image-capturing unit 110, and an amount of the light is adjusted by an opened/closed degree of an aperture 115, and then an image of the object is formed on a light-receiving surface of an image-capturing device 117. The image formed on the light-receiving surface of the image-capturing device 117 is converted into an electric image signal by a photo-electric conversion process. Examples of the image-capturing device 117 include a charge-coupled device (CCD), and a complementary metal oxide semiconductor (CMOS) image sensor. The aperture 115 becomes an open state during a normal state or when an auto-focusing algorithm that is performed by receiving a first release signal formed by pressing a release button by half is executed, and the aperture 115 may execute an exposure process by receiving a second release signal formed by softly pressing the release button. The positions, etc. of the zoom lens 111 and the focus lens 113 are controlled by a zoom lens driver 112 and a focus lens driver 114, respectively. An opening degree, etc. of the aperture 115 are controlled by an aperture driver 116. Sensitivity, etc. of the image-capturing device 117 are controlled by an image-capturing device controller 118. The zoom lens driver 112, the focus lens driver 114, the aperture driver 116, and the image-capturing device controller 118 control relevant components according to results operated by the digital signal processor 200 based on exposure information, focus information, etc.

The image signal processor 120 converts an analog image signal input from the image-capturing device 117 into a digital image signal, and performs various image processes on the converted digital image signal. The image signal on which these processes have been performed may be stored in the storage 130 and output to the display 300, or transmitted to outside under control of the digital signal processor 200. The image signal processor 120 improves image quality by performing signal processes such as auto white balance, auto exposure, gamma correction, etc. in order to convert image data suitable for a human sense of vision, and outputs an image signal having an improved image quality. Also, the image signal processor 120 performs image processes such as color filter array interpolation, a color matrix, color correction, and color enhancement.

The storage 130 may store a program regarding operations of the image processing apparatus 100, or store image data or other data regardless of whether power is supplied.

The digital signal processor 200 performs an operation according to an operating system and an application stored in the storage 130, stores the operation results, and allows the image processing apparatus 100 to operate by controlling a relevant component according to the operation result. Particularly, the digital signal processor 200 according to an exemplary embodiment allows the focus lens 113 to sequentially move from infinity to a short distance by controlling the focus lens driver 114, calculates relative distance information of objects included in an image, actual distance information of the objects, and actual size information of the objects, and displays the same on the display 300. Also, the digital signal processor 200 according to another exemplary embodiment operates an opening degree of the aperture 115 from a maximum opening to a minimum opening by controlling the aperture driver 116, calculates relative distance information of objects included in an image, actual distance information of the objects, and actual size information of the objects, and displays the same on the display 300. For this purpose, the digital signal processor 200 may include a distance information calculator 210 and a size information calculator 220.

Figure 2A:
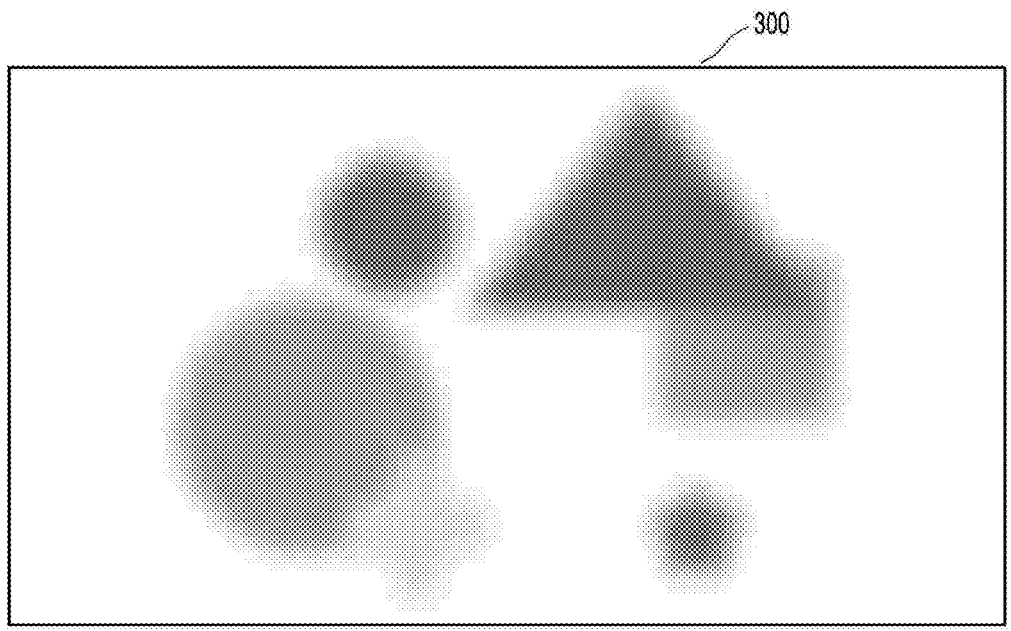
FIGS. 2A to 2D are diagrams for explaining calculation of relative distance information of an object.
Figure 2B:
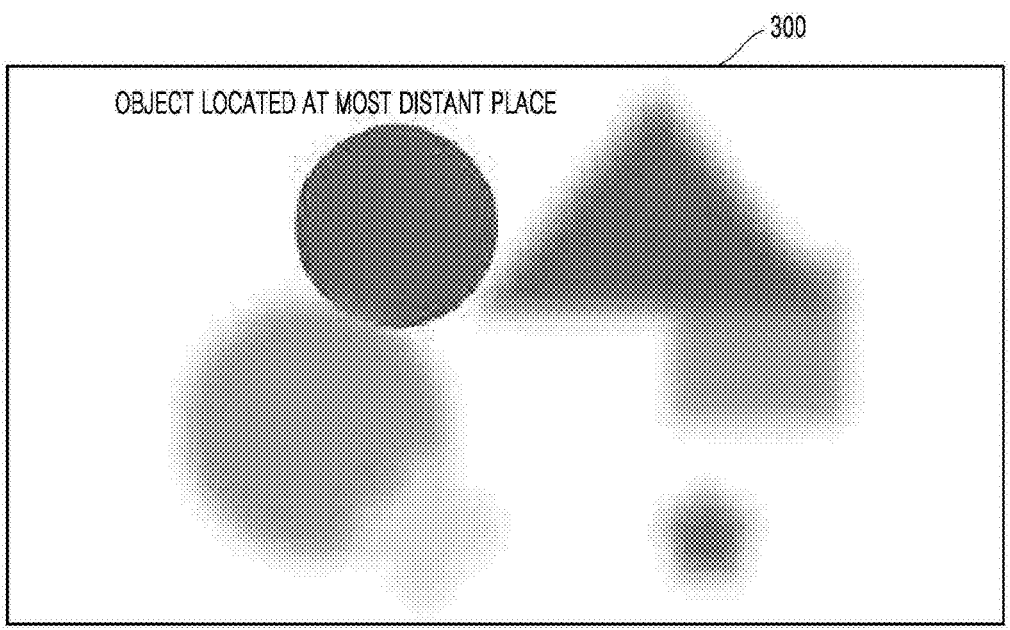
Figure 2C:
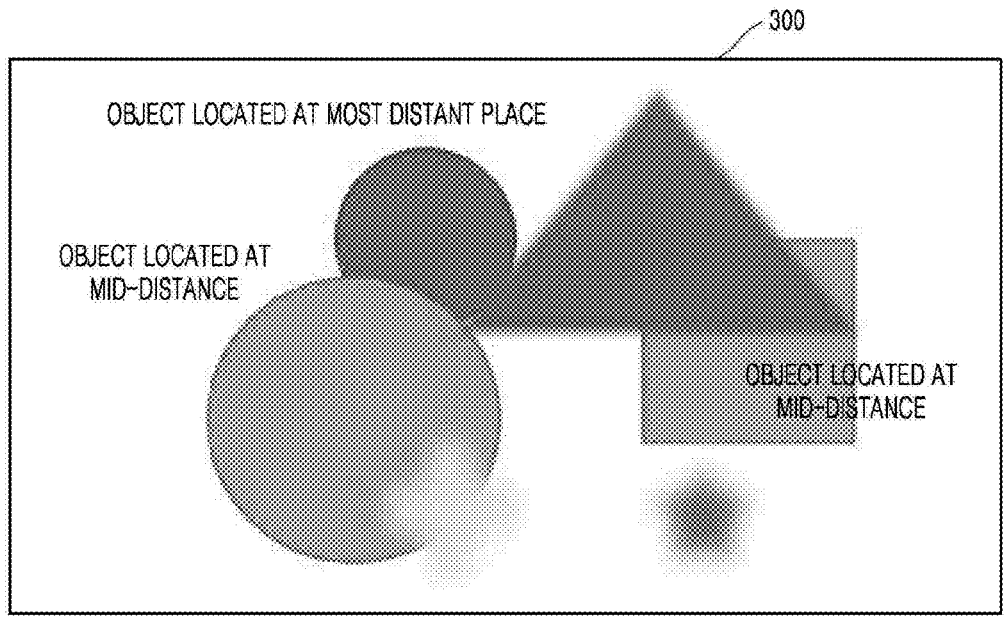
Figure 2D:
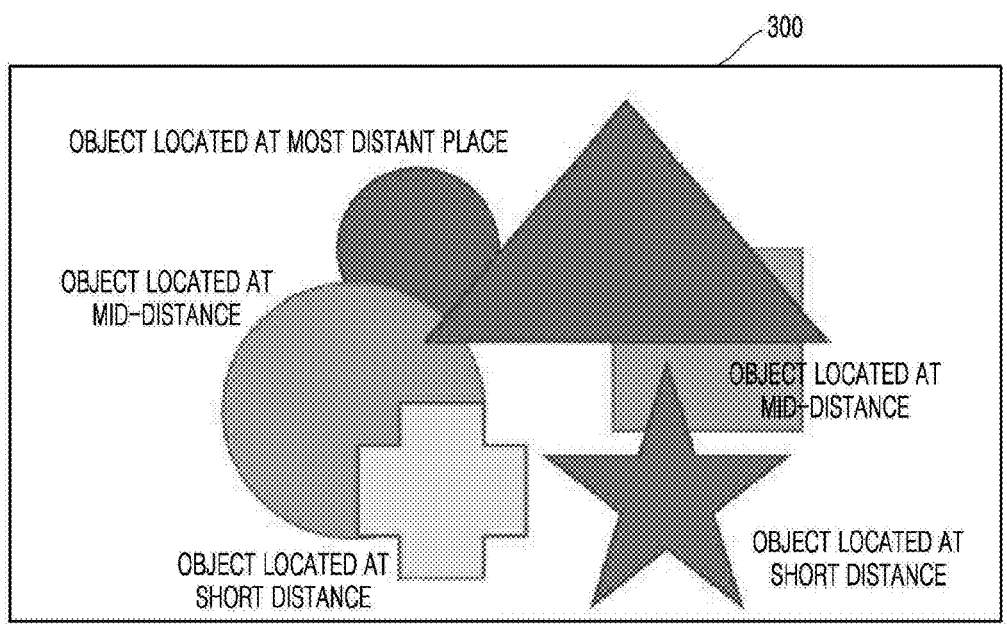
Figure 3:
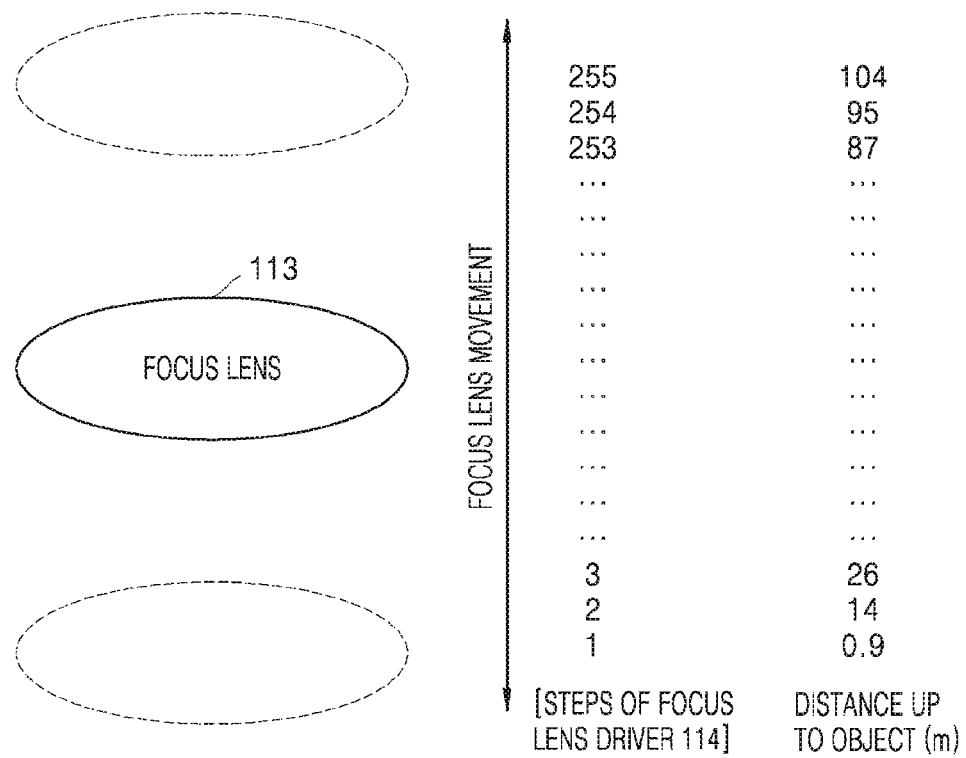
FIG. 3 is a diagram for explaining establishment of a focus lens location-based database.

First, an operation of the digital signal processor 200 according to an exemplary embodiment is described with reference to FIGS. 2 to 4. FIGS. 2A to 2D are diagrams for explaining calculation of relative distance information of an object.

The distance information calculator 210 sets so that a focal length of the focus lens 113 may be infinity by controlling the focus lens driver 114. Here, the focus lens driver 114 may be an actuator that moves the focus lens 113, and for example, may be a voice coil motor. When the focus lens 113 is set to infinity, a screen illustrated in FIG. 2A is displayed on the display 300.

The distance information calculator 210 moves the focus lens 113 from infinity to a short distance by controlling the focus lens driver 114, overlaps and stores frames at which an object is focused. FIGS. 2B and 2C are diagrams illustrating objects focused at a most distant place and a mid-distance while moving the focus lens 113 to a short distance. Here, focused objects may be selectively stored while a frame is stored. For example, in the case where two or more objects focused at a mid-distance exist as illustrated in FIG. 2C, when arbitrary one object is selected, only a relevant focused object frame may be stored.

The distance information calculator 210 synthesizes overlapping image frames in one frame and displays the same, and simultaneously, displays relative distance information of objects focused at different locations of the focus lens 113 based on an object focused at an arbitrary location of the focus lens 113. For example, based on an object focused at a most distant place of the focus lens 113 as illustrated in FIG. 2B, focused locations of other objects may be displayed as a most distance place, a mid-distance, a short distance, etc. as illustrated in FIG. 2D. In the case of FIG. 2D, it is known that relative distance information for all objects are included.

Figure 4A:
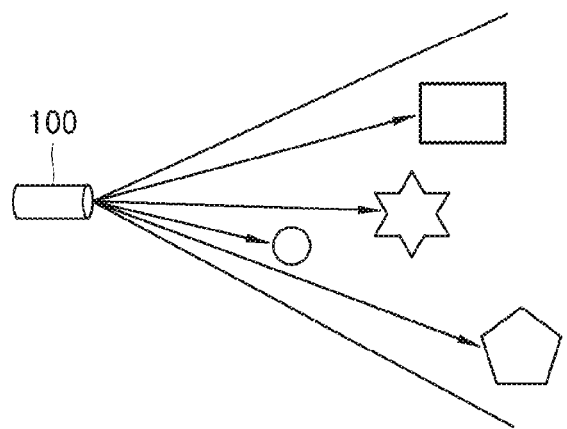
FIGS. 4A and 4B are diagrams for explaining calculation of actual distance information of an object.
Figure 4B:
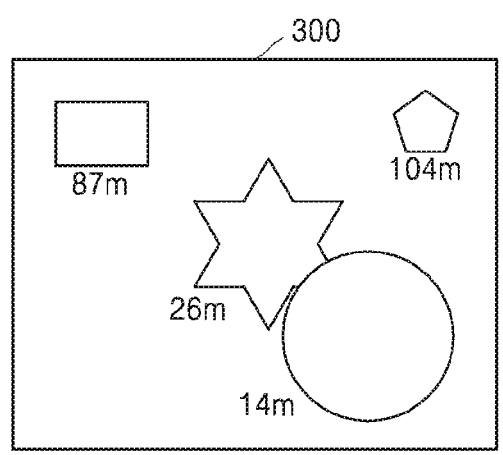

Subsequently, the distance information calculator 210 that calculates actual distance information of objects included in an image is described with reference to FIGS. 3 and 4. FIG. 3 is a diagram for explaining establishment of a focus lens location-based database, and FIGS. 4A and 4B are diagrams for explaining calculation of actual distance information of an object.

For calculation of actual distance information of an object, a database is established and stored in the storage 130 first. Here, the database denotes a database that maps actual distance information from the image processing apparatus 100 to an object to each movement location of the focus lens 113, and may be established by experiment. Referring to FIG. 3, the focus lens 113 is moved from infinity to a short distance on a step basis by the focus lens driver 114, and a distance of an object is mapped to a step when focusing is performed and the location of the focus lens 113 is fixed. For example, in the case where steps of the focus lens driver 114 are in a range from about 0 to about 255, distances of an object ranging from about 0.9 to about 104 m may be allocated to respective steps.

The distance information calculator 210 moves the focus lens 113 from infinity to a short distance by controlling the focus lens driver 114, overlaps and stores focused frames. In this case, whenever each object is focused, actual distance information mapped to a step of the focus lens driver 114 may be obtained.

The distance information calculator 210 displays a synthesis frame that synthesizes overlapping image frames in one frame, and simultaneously, detects actual distance information mapped to each focused object from the database, and displays the same on the display 300. FIG. 4A illustrates objects having different distances from the image processing apparatus 100, and FIG. 4B illustrates displaying actual distance information of respective objects generated by the distance information calculator 210 inside a synthesis frame.

First, an operation of the digital signal processor 200 according to another exemplary embodiment is described with reference to FIGS. 5 and 6. FIGS. 5A and 5B are diagrams illustrating open states of the aperture 115 and images corresponding thereto.

A depth of field denotes a range recognized as being focused in an image. That is, a depth of field determines whether to allow only an intended object to be focused with a background of the object not focused (out of focus), or whether to allow not only the intended object but also the background of the object to be focused (pan focus).

Figure 5A:
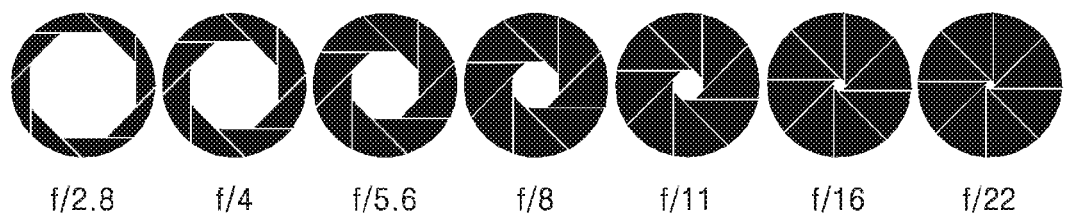
FIGS. 5A and 5B are diagrams illustrating open states of an aperture and images corresponding thereto.

FIG. 5A is a diagram illustrating open states of the aperture 115, in which an amount of light passing through the lens reduces from left to right, resulting in deep depth of field recognized as being focused. In FIG. 5A, f/2.8 may be a state under which the aperture 115 is open maximally, and f/22 may be a state under which the aperture 115 is open minimally. That is, a depth recognized as being focused may change depending on an opening degree of the aperture 115.

Figure 5B:
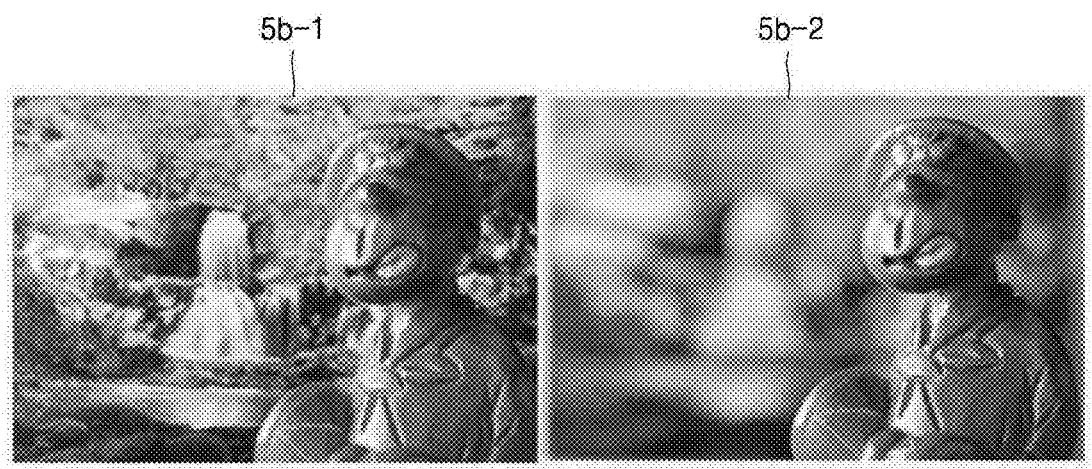

FIG. 5B-1 is an image captured with an opening degree of the aperture 115 set to f/22 of FIG. 5A, and FIG. 5B-2 is an image captured with an opening degree of the aperture 115 set to f/2.8 of FIG. 5A. From this, it is known that the smaller an opening degree of the aperture 115 is small, the deeper a depth of field recognized as being focused does. The digital signal processor 200 may extract distance information of an object by detecting an opening degree of the aperture 115 via the aperture driver 116 based on this principle.

The distance information calculator 210 operates an opening degree of the aperture 115 from a maximum opening to a minimum opening by controlling the aperture driver 116, and overlaps and stores frames including an object focused under each open state. Here, the distance information calculator 210 may selectively store focused objects when storing a frame. For example, in the case where an open state of the aperture 115 is f/5.6 and two or more focused objects exist, when arbitrary one object is selected, only a relevant focused object frame may be stored. Also, when all objects are selected, relevant focused object frames may be stored.

The distance information calculator 210 displays a synthesis frame that synthesizes overlapping image frames in one frame, and simultaneously, displays relative distance information of objects focused at different open states of the aperture 115 based on an object focused under an arbitrary open state of the aperture 115.

Subsequently, the distance information calculator 210 that calculates actual distance information of objects included in an image is described with reference to FIG. 6. FIG. 6 is a diagram for explaining establishment of an aperture open state-based database.

For calculation of actual distance information of an object, a database is established and stored in the storage 130 first. Here, the database denotes a database that maps actual distance information from the image processing apparatus 100 to an object to each open state of the aperture 115, and may be established by experiment. Referring to FIG. 6, an opening degree of the aperture 115 is operated from a maximum opening to a minimum opening by the aperture driver 116, and a distance of an object is mapped to an open state of the aperture 115 under which focusing is performed. For example, in the case where an open state of the aperture 115 is in a range from about f/2.8 to about f/22, a distance of an object corresponding to each open state may be allocated to about 1 to about 30 m. Here, an open state of the aperture 115 and a distance of an object are shown as an exemplary embodiment, and may extend or change.

The distance information calculator 210 operates an opening degree of the aperture 115 from the maximum opening to the minimum opening by controlling the aperture driver 116, and overlaps and stores focused frames. In this case, whenever each object is focused, actual distance information mapped to an open state of the aperture 115 may be obtained.

The distance information calculator 210 displays a synthesis frame that synthesizes overlapping image frames in one frame, and simultaneously, detects actual distance information mapped to each focused object from the database, and displays the same on the display 300. FIG. 4A illustrates objects having different distances from the image processing apparatus 100, and FIG. 4B illustrates displaying actual distance information of respective objects generated by the distance information calculator 210 inside a synthesis frame.

According to another exemplary embodiment, for calculation of distance information of an object, the aperture 115 and a shutter speed may be used. The shutter speed represents a speed of opening and closing a shutter one time. The shutter speed is related to a time for which the image-capturing device 117 is exposed to light and means that different shutter speeds should be applied depending on an amount of light, movement of an object, etc. That is, when the above-mentioned opening degree of the aperture 115 and shutter speed are used together, image information and distance information of better image quality may be obtained. For example, when f/22 is used to deepen a depth of field, an image in which an object located far away is focused may be obtained, but an amount of light is relatively small and thus a relatively dark image is obtained. Therefore, an effective image may be obtained by slowing a shutter speed and thus increasing an amount of light.

Figures 6, 7:
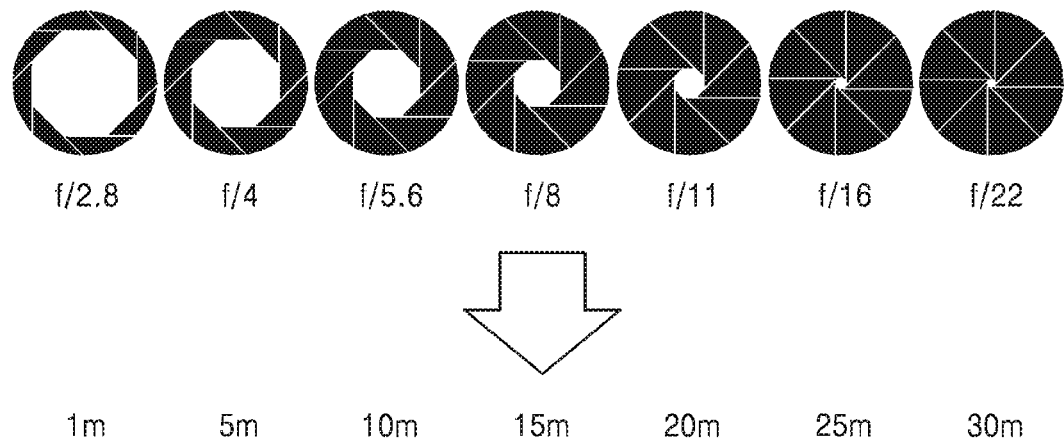
FIG. 6 is a diagram for explaining establishment of an aperture open state-based database.
FIG. 7 is a view illustrating a shutter speed setting table depending on an aperture open state.

FIG. 7 is a view illustrating a shutter speed setting table depending on an aperture open state. From FIG. 7, a shutter speed value changes depending on an open state of the aperture 115. Particularly, as an aperture value representing an open state of the aperture 115 increases, an open state of the aperture 115 gradually reduces, and thus when an aperture value is small (for example, f/2.8), a shutter speed may be set fast (for example, 1/120), and when an aperture value is large (for example, f/5.6), a shutter speed may be set slow (for example, 1/30). When the aperture value and the shutter speed value are set as described above, an image of the same exposure may be obtained.

Next, the size information calculator 220 that calculates actual size information of objects included in an image is described with reference to actual distance information of the distance information calculator 210 and FIG. 8. FIGS. 8A to 8C are diagrams for explaining calculation of actual size information of an object.

Figure 8A:
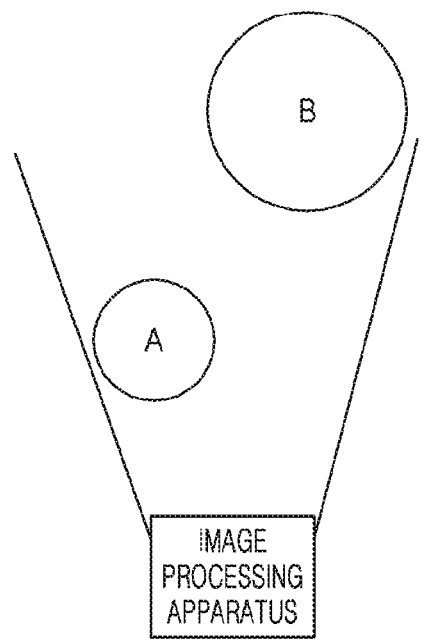
FIGS. 8A to 8C are diagrams for explaining calculation of actual size information of an object.
Figure 8B:
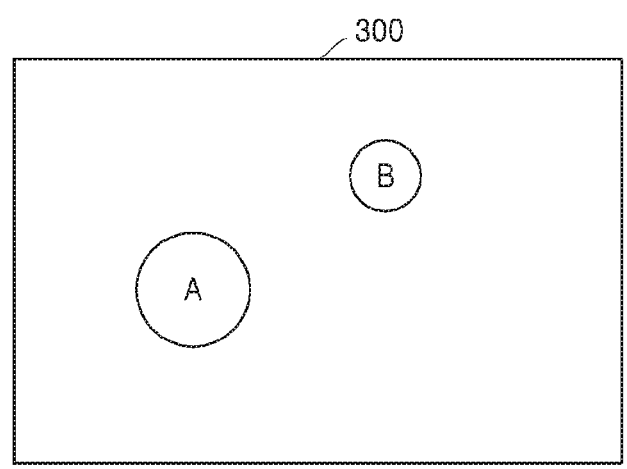
Figure 8C:
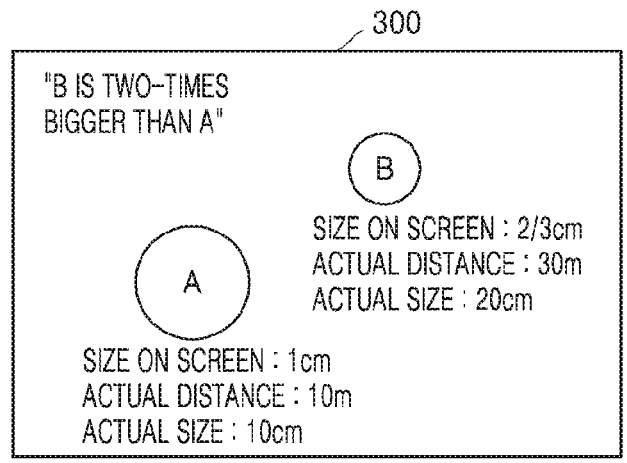

FIG. 8A illustrates a state under which the image processing apparatus 100 captures an object A and an object B, and FIG. 8B illustrates a state in which captured object A and object B are displayed on the display 300. Generally, object detection depends on only an absolute size of an object displayed on the display 300. However, actually, it is considered that the object B (for example, a person) located far away rather than the object A (for example, a pet) located close is more suitable as a detection object. That is, size correction by an actual distance value between an object at a short distance and an object located far away is required, and object detection should be performed by reflecting the size correction.

As illustrated in FIG. 8B, since the object A is less than the object B in its absolute size but is located at a short distance, the object A is recognized as larger on the display 300. That is, in the case where object detection is performed based on a predetermined size on the display 300, the object A may be detected but the object B may not be detected. However, when a fact that the object B is greater than the object A actually is taken into account, effective information should be obtained by surely using distance information. Therefore, when object detection is performed by using actual distance information of an object, more effective data may be extracted.

The size information calculator 220 calculates actual size information of an object by using actual distance information of the object and displays the same on the display 300. The size information calculator 220 calculates a size of each object inside a synthesis frame illustrated in FIG. 8C. For example, it is assumed that a size of the object A on a screen has been calculated as 1 cm, and a size of the object B on the screen has been calculated as ⅔ cm.

The size information calculator 220 obtains actual distance information of the object A and the object B from the distance information calculator 210. For example, it is assumed that the size information calculator 220 has obtained actual distance information of the object A as 10 m and actual distance information of the object B as 30 m from the distance information calculator 210. When the actual distance information of the object A and the object B are obtained, an actual distance information ratio of the object B may be calculated based on the actual distance information of the object A, and the ratio is 1:3. That is, the actual distance information of the object B is three times-farther than the actual distance information of the object A.

From this, the size information calculator 220 may obtain that an actual size of the object B and an actual size of the object A. From this, in the case where a size of the object A is 1 cm in a synthesis frame, an actual size of the object A becomes 10 cm, and in the case where a size of the object B is ⅔ cm in a synthesis frame, an actual size of the object B becomes 20 cm and consequently, the object B is bigger than the object A. Therefore, the size information calculator 220 may display that the object B is bigger than the object A on the display 300.

As described above, distance information and size information of the object inside an image frame may be calculated without a separate distance measurement algorithm or size measurement algorithm.

An image processing method according to an exemplary embodiment is described below with reference to FIGS. 9 to 11. The image processing method according to an exemplary embodiment may be performed inside the image processing apparatus 100 illustrated in FIG. 1. According to an exemplary embodiment, a primary algorithm of the operating method may be performed inside the digital signal processor 200 with assistance of peripheral components inside the apparatus. In the following description, descriptions of portions that are the same as those in FIGS. 1 to 8 are omitted.

Figure 9:
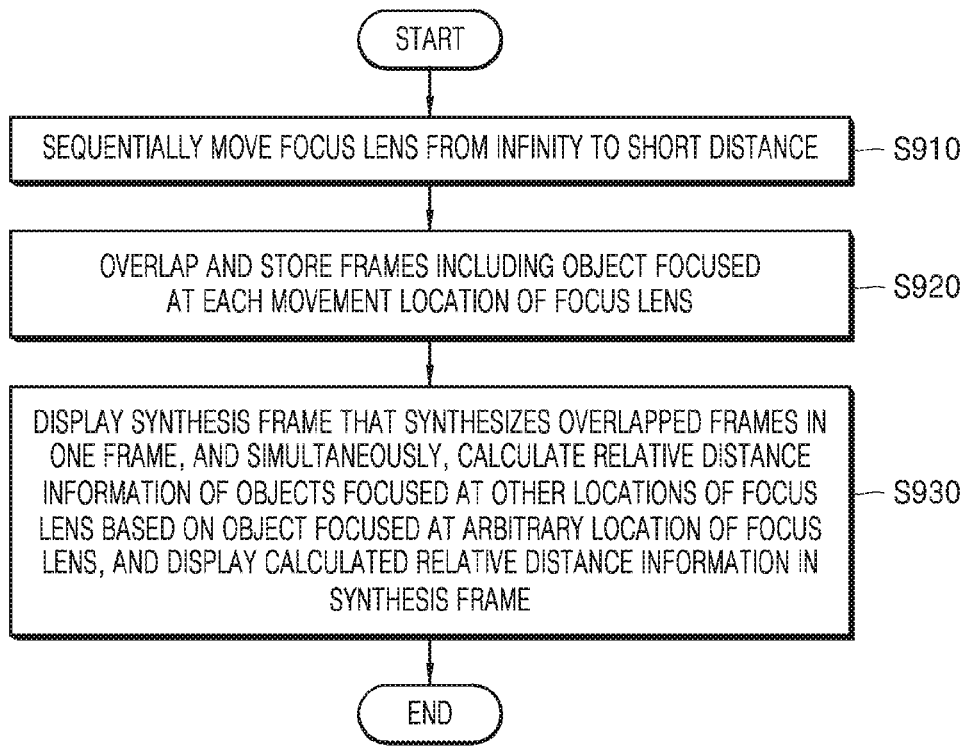
FIGS. 9 to 14 are flowcharts illustrating operations of an image processing method according to an exemplary embodiment.

FIG. 9 is a flowchart illustrating operations of a method of calculating relative distance information of an object according to an exemplary embodiment in an image processing method according to an exemplary embodiment.

Referring to FIG. 9, the digital signal processor 200 performs operation S910 of sequentially moving the focus lens 113 from infinity to a short distance by controlling the focus lens driver 114.

The digital signal processor 200 performs operation S920 of overlapping and storing frames including an object focused at each movement location of the focus lens 113 while sequentially moving the focus lens 113 from infinity to a short distance. Here, the focused objects may be selectively stored when a frame is stored. For example, in the case where two or more objects focused at a mid-distance exist, when an arbitrary one object is selected, only a relevant focused object frame may be stored. Alternatively, when all objects are selected, all focused object frames may be stored.

After that, the digital signal processor 200 performs operation S930 of displaying a synthesis frame that synthesizes overlapping frames in one frame, and simultaneously, calculating relative distance information of objects focused at other locations of the focus lens 113 based on an object focused at an arbitrary location of the focus lens 113, and displaying the calculated relative distance information in the synthesis frame. For example, focused locations of other objects may be displayed as a short distance, a mid-distance, and a farthest distance based on an object focused at a short distance by the focus lens 113. Therefore, distance information of all objects focused inside the synthesis frame may be displayed.

Figure 10:
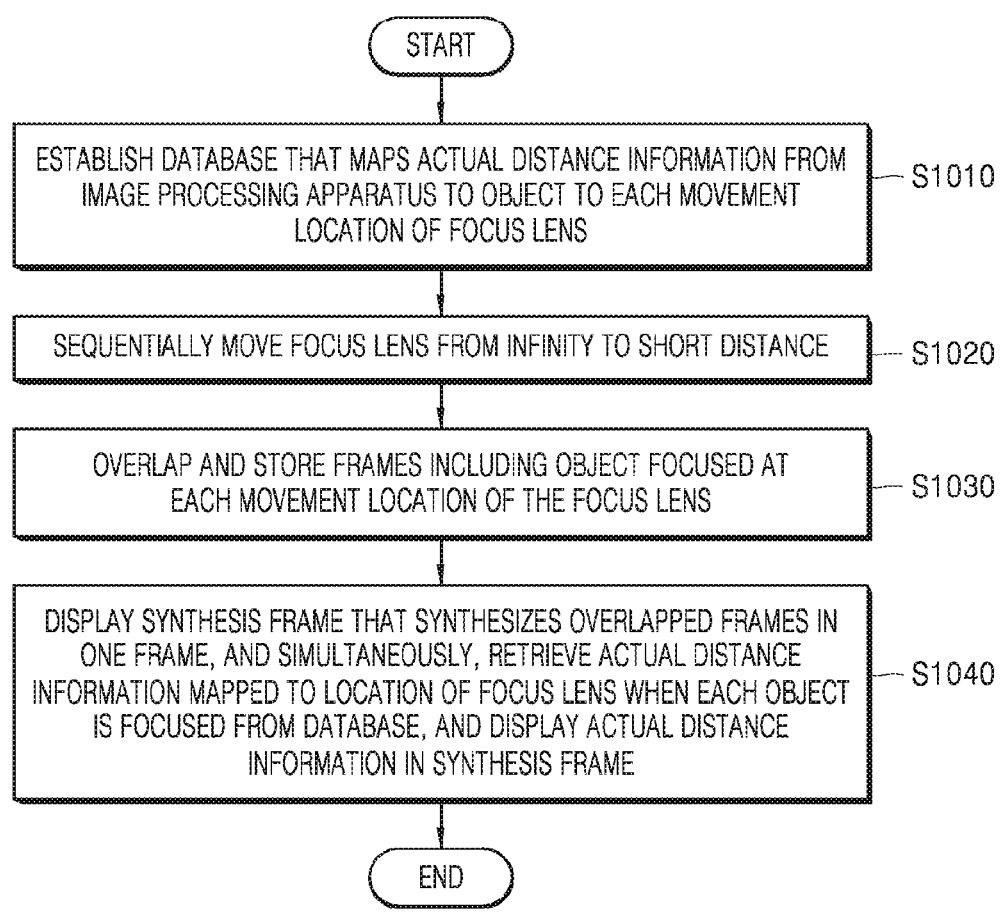

FIG. 10 is a flowchart illustrating operations of a method of calculating actual distance information of an object according to an exemplary embodiment in an image processing method according to an exemplary embodiment.

Referring to FIG. 10, the digital signal processor 200 performs operation S1010 of establishing a database that maps actual distance information from the image processing apparatus 100 to an object to each movement location of the focus lens 113. The focus lens 113 is moved from infinity to a short distance on each step basis by the focus lens driver 114, and a distance of an object is mapped to a step when focusing is performed and a location of the focus lens 113 is fixed. When the establishment of the database is completed, the digital signal processor 200 performs operation S1020 of sequentially moving the focus lens 113 from infinity to a short distance by controlling the focus lens driver 114.

The digital signal processor 200 performs operation S1030 of overlapping and storing frames including an object focused at each movement location of the focus lens 113 while sequentially moving the focus lens 113 from infinity to a short distance.

After that, the digital signal processor 200 performs operation S1040 of displaying a synthesis frame that synthesizes overlapping frames in one frame, and simultaneously, detecting actual distance information mapped to a step of the focus lens driver 114 when each object is focused from the database, and displaying the actual distance information in the synthesis frame.

Figure 11:
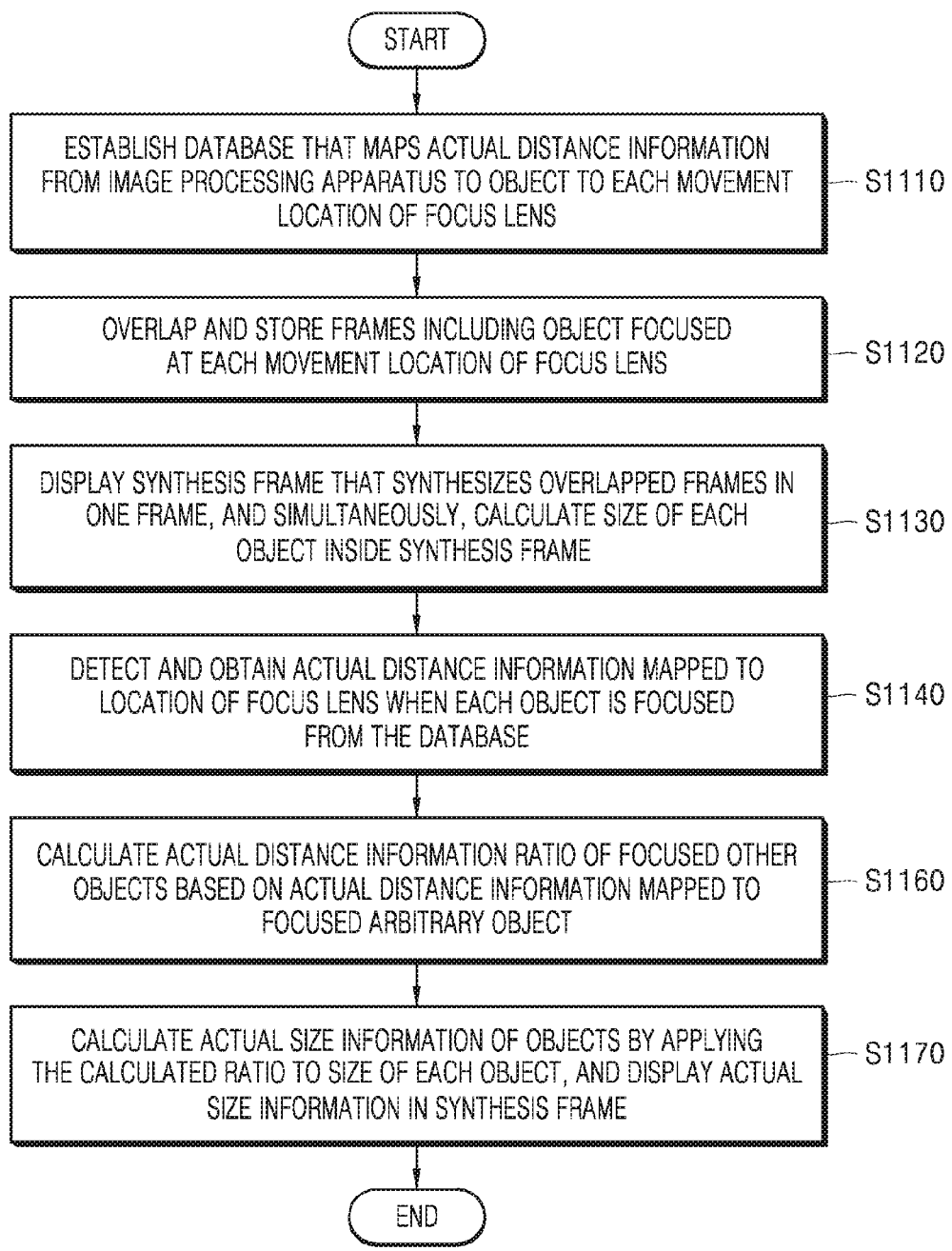

FIG. 11 is a flowchart illustrating operations of a method of calculating actual size information of an object according to an exemplary embodiment in the image processing method according to an exemplary embodiment.

Referring to FIG. 11, the digital signal processor 200 performs operation S1110 of establishing a database that maps actual distance information from the image processing apparatus 100 to an object to each movement location of the focus lens 113.

When the establishment of the database is completed, the digital signal processor 200 performs operation S1120 of sequentially moving the focus lens 113 from infinity to a short distance by controlling the focus lens driver 114.

The digital signal processor 200 performs operation of overlapping and storing frames including an object focused at each movement location of the focus lens 113 while sequentially moving the focus lens 113 from infinity to a short distance.

After that, the digital signal processor 200 performs operation S1130 of displaying a synthesis frame that synthesizes overlapping frames in one frame, and simultaneously, calculating a size of each object inside the synthesis frame.

When the calculation of the size of the object inside the synthesis frame is completed, the digital signal processor 200 perform operation S1140 of detecting and obtaining actual distance information mapped to a step of the focus lens driver 114 when each object is focused from the database.

When the obtaining of the actual distance information of the object is completed, the digital signal processor 200 performs operation S1160 of calculating an actual distance information ratio of focused other objects based on actual distance information mapped to a focused arbitrary object.

When the calculation of the ratio is completed, the digital signal processor 200 performs operation S1170 of calculating actual size information of objects by applying the calculated ratio to a size of each object, and displaying the actual size information in the synthesis frame.

Figure 12:
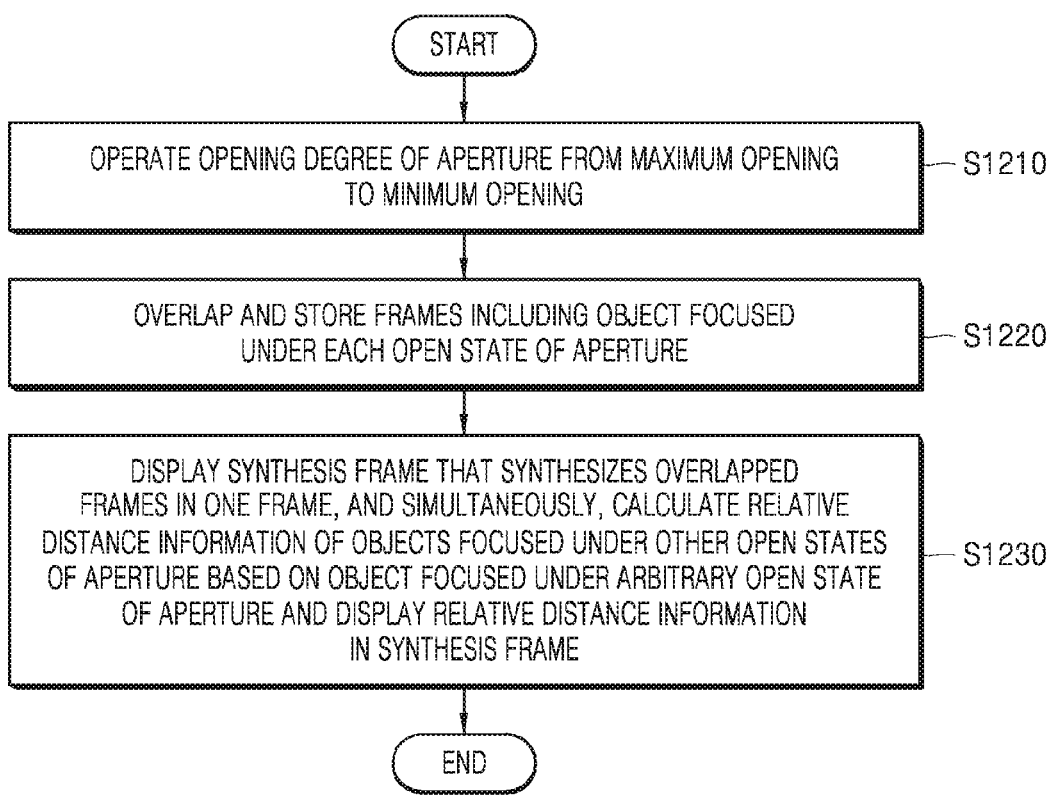

FIG. 12 is a flowchart illustrating operations of a method of calculating relative distance information of an object according to another exemplary embodiment in an image processing method according to an exemplary embodiment.

Referring to FIG. 12, the digital signal processor 200 performs operation S1210 of operating an opening degree of the aperture 115 from a maximum opening to a minimum opening by controlling the aperture driver 116.

The digital signal processor 200 performs operation S1220 of overlapping and storing frames including an object focused under each open state of the aperture 115 while operating the opening degree of the aperture 115 from the maximum opening to the minimum opening. Here, focused objects may be selectively stored when a frame is stored. For example, in the case where two or more objects focused at a mid-distance exist, when an arbitrary one object is selected, only a relevant focused object frame may be stored. Alternatively, when all objects are selected, focused all object frames may be stored.

After that, the digital signal processor 200 performs operation S1230 of displaying a synthesis frame that synthesizes overlapping frames in one frame, and simultaneously, calculating relative distance information of objects focused under other open states of the aperture 115 based on an object focused under an arbitrary open state of the aperture 115 and displaying the relative distance information in the synthesis frame.

Figure 13:
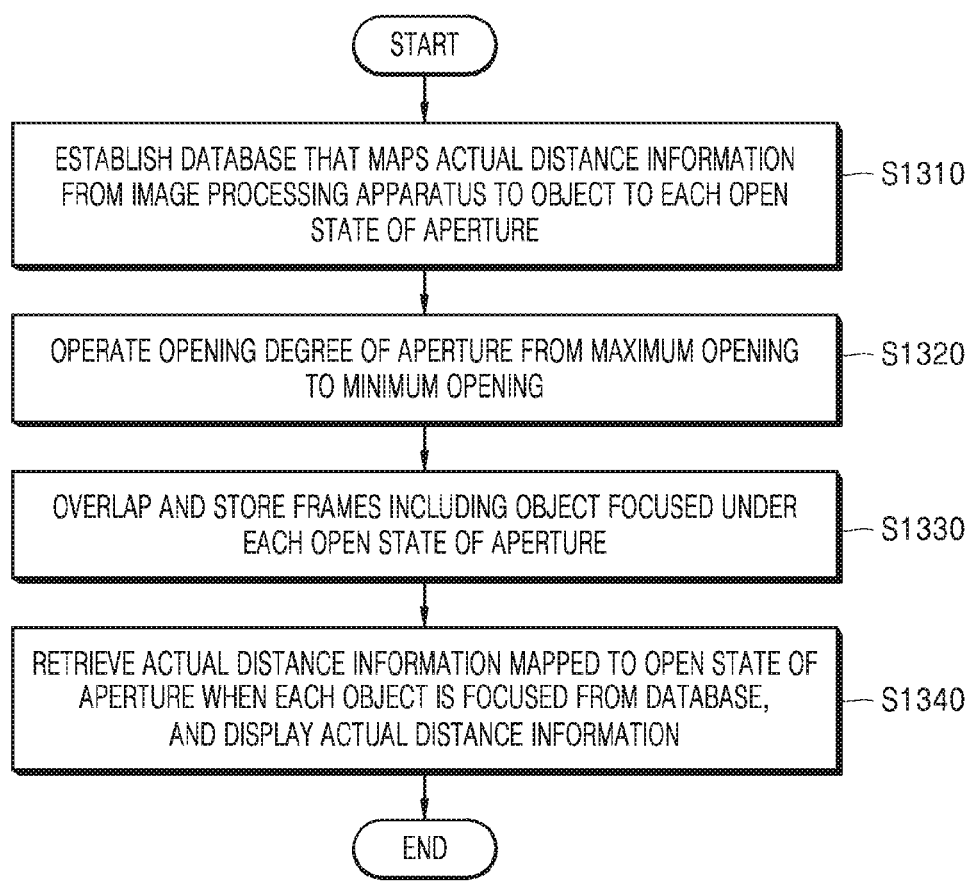

FIG. 13 is a flowchart illustrating operations of a method of calculating actual distance information of an object according to another exemplary embodiment in an image processing method according to an exemplary embodiment.

Referring to FIG. 13, the digital signal processor 200 performs operation S1310 of establishing a database that maps actual distance information from the image processing apparatus 100 to an object to each open state of the aperture 115. The aperture 115 is operated from a maximum opening to a minimum opening by the aperture driver 116, and a distance of an object is mapped to an open state of the aperture 115 under which focusing is performed.

When the establishment of the database is completed, the digital signal processor 200 performs operation S1320 of operating the aperture 115 from a maximum opening to a minimum opening by controlling the aperture driver 116.

The digital signal processor 200 performs operation S1330 of overlapping and storing frames including an object focused under each open state of the aperture 115 while operating the aperture 115 from the maximum opening to the minimum opening.

After that, the digital signal processor 200 performs operation S1340 of displaying a synthesis frame that synthesizes overlapping frames in one frame, and simultaneously, detecting actual distance information mapped to an open state of the aperture 115 when each object is focused from the database, and displaying the actual distance information. According to another exemplary embodiment, for calculation of distance information of an object, the aperture 115 and the shutter speed may be used.

Figure 14:
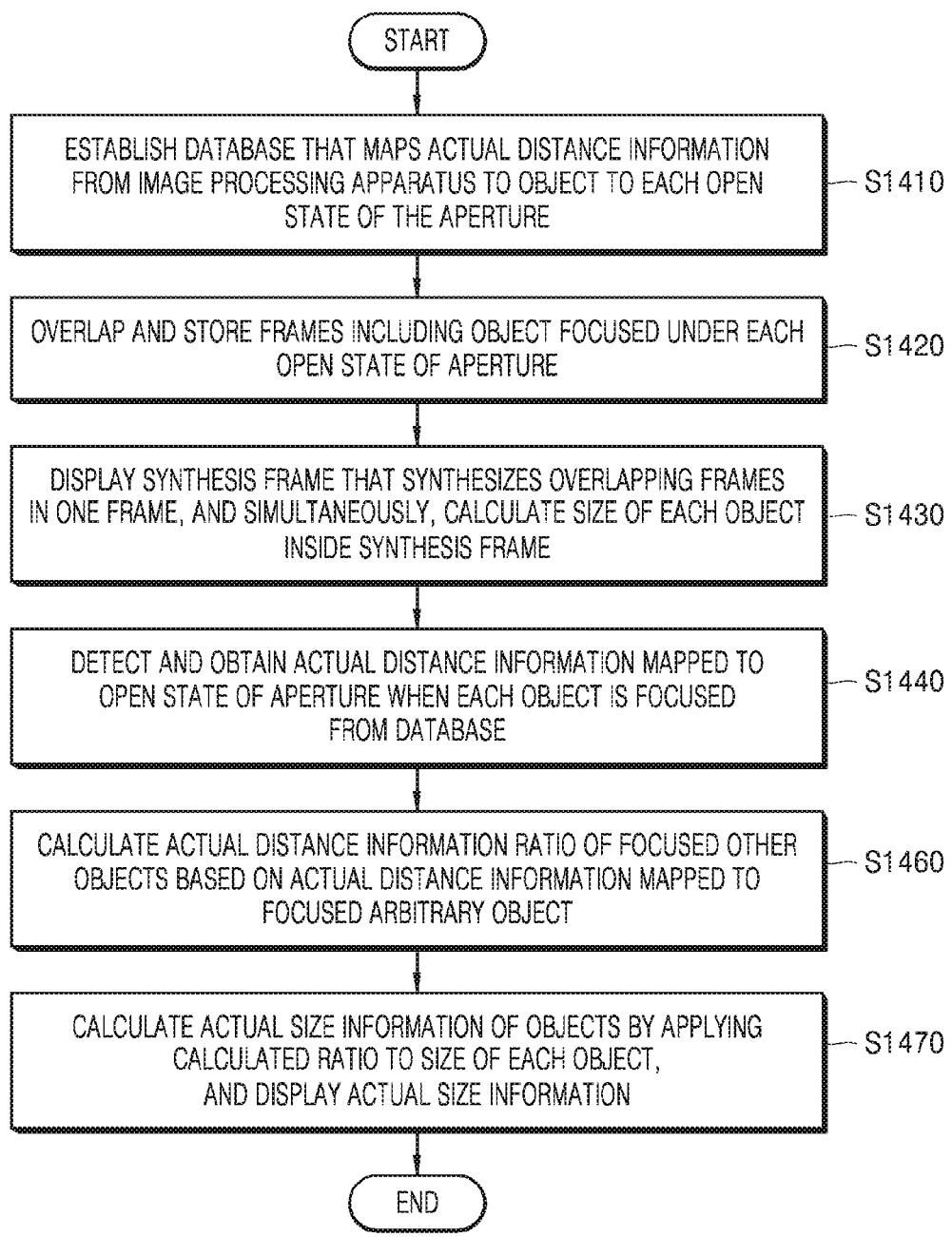

FIG. 14 is a flowchart illustrating operations of a method of calculating actual size information of an object according to another exemplary embodiment in an image processing method according to an exemplary embodiment.

Referring to FIG. 14, the digital signal processor 200 performs operation S1410 of establishing a database that maps actual distance information from the image processing apparatus 100 to an object to each open state of the aperture 115.

When the establishment of the database is completed, the digital signal processor 200 performs operation S1420 of operating the aperture 115 from a maximum opening to a minimum opening by controlling the aperture driver 116.

The digital signal processor 200 performs operation of overlapping and storing frames including an object focused under each open state of the aperture 115 while operating the aperture 115 from the maximum opening to the minimum opening.

After that, the digital signal processor 200 performs operation S1430 of displaying a synthesis frame that synthesizes overlapping frames in one frame, and simultaneously, calculating a size of each object inside the synthesis frame.

When the calculation of the size of the object inside the synthesis frame is completed, the digital signal processor 200 performs operation S1440 of detecting and obtaining actual distance information mapped to an open state of the aperture 115 when each object is focused from the database.

When the obtaining of the actual distance information of the object is completed, the digital signal processor 200 performs operation S1460 of calculating an actual distance information ratio of focused other objects based on actual distance information mapped to a focused arbitrary object.

When the ratio calculation is completed, the digital signal processor 200 performs operation S1470 of calculating actual size information of objects by applying the calculated ratio to a size of each object, and displaying the actual size information in the synthesis frame.

While this inventive concept has been particularly shown and described with reference to exemplary embodiments thereof, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

INDUSTRIAL APPLICABILITY

The inventive concept relates to an apparatus and a method of calculating distance information and size information of an object within an image frame.

The invention claimed is:

1. A method of processing an image, the method comprising:
    sequentially moving a focus lens from infinity to a short distance;
    overlapping and storing frames comprising an object focused at each movement location of the focus lens;
    displaying a synthesis frame that synthesizes the overlapped frames in one frame, and simultaneously, calculating relative distance information of objects focused at different locations of the focus lens based on an object focused at an arbitrary location of the focus lens, and displaying the relative distance information in the synthesis frame; and
    calculating a size of each object inside the synthesis frame, calculating an actual distance information ratio of focused other objects based on actual distance information mapped to a focused arbitrary object, and calculating and displaying actual size information of the objects by applying the ratio to the size of the each object.

2. The method of claim 1, wherein the overlapping and displaying comprises: when at least two objects exist at an arbitrary location of movement locations of the focus lens, overlapping and storing frames comprising a selected object.

3. The method of claim 1, further comprising:
    establishing a database that maps actual distance information from an image processing apparatus to an object to each movement location of the focus lens.

4. The method of claim 3, wherein the displaying comprises:
    displaying a synthesis frame that synthesizes the overlapped frames in one frame, and simultaneously, and retrieving the actual distance information mapped to the location of the focus lens when each object is focused from the database, and displaying the actual distance information in the synthesis frame.

5. A method of processing an image, the method comprising:

operating an opening degree of an aperture from a maximum opening to a minimum opening;

overlapping and storing frames comprising an object focused under each open state of the aperture;

displaying a synthesis frame that synthesizes the overlapped frames in one frame, and simultaneously, calculating relative distance information of objects focused under other open states of the aperture based on an object focused under an arbitrary open state of the aperture, and displaying the relative distance information in the synthesis frame; and calculating a size of each object inside the synthesis frame, calculating an actual distance information ratio of focused other objects based on actual distance information mapped to a focused arbitrary object, and calculating and displaying actual size information of the objects by applying the ratio to the size of the each object.

6. The method of claim 5, wherein the overlapping and storing comprises: when at least two objects exist under an arbitrary open state of open states of the aperture, overlapping and storing frames comprising a selected object.

7. The method of claim 5, further comprising:

establishing a database that maps actual distance information from an image processing apparatus to an object to each open state of the aperture.

8. The method of claim 7, further comprising:

mapping and storing a different shutter speed depending on each open state of the aperture when establishing the database.

9. The method of claim 7, wherein the displaying comprises:

displaying a synthesis frame that synthesizes the overlapped frames in one frame, and simultaneously, and retrieving the actual distance information mapped to an open state of the aperture from the database when each object is focused, and displaying the retrieved actual distance information inside the synthesis frame.

10. An image processing apparatus comprising:

a focus lens;

a lens driver sequentially moving a focus lens from infinity to a short distance;

a distance information calculator overlapping and storing frames comprising an object focused at each movement location of the focus lens, and displaying a synthesis frame that synthesizes the overlapped frames in one frame, and simultaneously, calculating and displaying relative distance information of objects focused at different locations of the focus lens based on an object focused at an arbitrary location of the focus lens; and a size information calculator calculating a size of each object inside the synthesis frame, calculating an actual distance information ratio of focused other objects based on actual distance information mapped to a focused arbitrary object, and calculating and displaying actual size information of the objects by applying the ratio to the size of the each object.

11. The apparatus of claim 10, wherein the distance information calculator overlaps and stores frames comprising a selected object when at least two objects exist at an arbitrary location of movement locations of the focus lens.

12. The apparatus of claim 10, wherein the distance information calculator establishes a database that maps actual distance information from an image processing apparatus to an object to each movement location of the focus lens, and retrieves the actual distance information mapped to the location of the focus lens when each object is focused from the database, and displays the actual distance information inside the synthesis frame.

13. An image processing apparatus comprising:

an aperture;

an aperture driver operating an opening degree of an aperture from a maximum opening to a minimum opening;

a distance information calculator overlapping and storing frames comprising an object focused under each open state of the aperture, display a synthesis frame that synthesizes the overlapped frames in one frame, and simultaneously, calculating and displaying relative distance information of objects focused under other open states of the aperture based on an object focused under an arbitrary open state of the aperture; and a size information calculator calculating a size of each object inside the synthesis frame, calculating an actual distance information ratio of focused other objects based on actual distance information mapped to a focused arbitrary object, and calculating and displaying actual size information of the objects by applying the ratio to the size of the each object.

14. The apparatus of claim 13, wherein the distance information calculator overlaps and stores frames comprising a selected object when at least two objects exist under an arbitrary open state of open states of the aperture.

15. The apparatus of claim 13, wherein the distance information calculator establishes a database that maps actual distance information from the image processing apparatus to an object to each open state of the aperture, and retrieves the actual distance information mapped to an open state of the aperture when each object is focused from the database, and displays the retrieved actual distance information inside the synthesis frame.

16. The apparatus of claim 15, wherein the distance information calculator maps and stores a different shutter speed depending on each open state of the aperture when establishing the database.

* * * * *